US006978138B2

(12) United States Patent
Japenga et al.

(10) Patent No.: US 6,978,138 B2
(45) Date of Patent: Dec. 20, 2005

(54) INTER-RAT CELL RESELECTION IN A WIRELESS COMMUNICATION NETWORK

(75) Inventors: Patricia A. Japenga, Ward, CO (US); Michael Kevin Spartz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 396 days.

(21) Appl. No.: 10/282,521

(22) Filed: Oct. 28, 2002

(65) Prior Publication Data

US 2004/0082328 A1 Apr. 29, 2004

(51) Int. Cl.[7] .......................... H04Q 7/20; H04Q 7/00; H04M 1/00
(52) U.S. Cl. ................ 455/436; 455/435.2; 455/552.1; 370/331; 370/332
(58) Field of Search ........................ 455/436, 437–442, 455/422.1, 435.2, 552.1; 370/328–338

(56) References Cited

U.S. PATENT DOCUMENTS

| 5,245,629 | A | * | 9/1993 | Hall ............................ 455/522 |
| 5,920,549 | A | * | 7/1999 | Bruckert et al. ............ 370/331 |
| 6,185,422 | B1 | * | 2/2001 | Mattila ........................ 455/434 |
| 6,625,132 | B1 | * | 9/2003 | Boettger et al. ............ 370/329 |
| 2002/0045449 | A1 | * | 4/2002 | Oobayashi ................... 455/436 |

FOREIGN PATENT DOCUMENTS

WO 0027158 5/2000
WO 0209464 1/2002

OTHER PUBLICATIONS

Universal Mobile Telecommunications System (UMTS) UE Procedures in Idle Mode and Procedures for Cell Reselection in Connected Mode (ETSI TS 125 304 v3.5.0 (Sep. 2000).

* cited by examiner

Primary Examiner—Sonny Trinh
Assistant Examiner—Thai Vu
(74) Attorney, Agent, or Firm—Philip R. Wadsworth; Charles D. Brown; Kanyon Jenckes

(57) ABSTRACT

This disclosure is directed to a technique for efficient inter-RAT (Radio Access Technology) cell reselection in a wireless communication system. In general, following an unsuccessful cell reselection attempt, the technique involves upgrading one or more cell selection criteria for the pertinent cell. By upgrading the cell reselection criteria, requirements for reselection of the cell in the future are made more stringent. The technique may promote more efficient cell reselection performance, thereby reducing the frequency of repeated, unsuccessful reselection attempts for the same cell. In this manner, the technique can be effective in reducing power consumption and computational overhead incurred by unsuccessful cell reselection attempts, thereby increasing standby time in a wireless communication device. The technique may be implemented within a wireless communication device that supports two or more RAT types, such as WCDMA and GSM. Accordingly, in some cases, the technique may be implemented within a GSM/WCDMA UE.

32 Claims, 4 Drawing Sheets

INTER-RAT CELL RESELECTION IN A WIRELESS COMMUNICATION NETWORK

TECHNICAL FIELD

The disclosure relates to wireless communication and, more particularly, techniques for cell reselection in wireless communication systems.

BACKGROUND

Third generation (3G) wireless communication systems, such as the Universal Mobile Telecommunication System (UMTS), permit interoperability between radio access networks, such as the Global System for Mobile Communications (GSM) and Universal Terrestrial Radio Access Network (UTRAN). For this reason, UMTS user equipment (UE), such as mobile radiotelephones, can support multiple radio access technologies (RATs). For example, a UE may support communication using either Wideband Code Division Multiple Access (WCDMA) or GSM RATs, and thereby permit access to wireless communication services via network equipment associated with UTRAN or GSM cells.

For interoperability, the UE implements a process that controls selection and reselection of cells associated with both RAT types, i.e., inter-RAT cell reselection. As an illustration, when a mobile UE is in GSM idle mode, it may perform signal measurements of neighboring UTRAN cells. If the UE determines that one of the neighboring UTRAN cells has a stronger signal level than the serving and neighboring GSM cells, and the signal level satisfies a network-specified threshold, the UE selects the UTRAN cell for communication services.

Upon selection of the UTRAN cell, the UE switches to the UTRA communication mode and attempts to "camp on" the UTRAN cell. To successfully camp on the UTRAN cell, however, the cell must also satisfy one or more additional cell selection criteria. Exemplary cell selection criteria are specified in Third Generation Partnership Project (3GPP) Technical Specification 25.304. If the UTRAN cell does not satisfy the cell selection criteria, the UE deselects the UTRAN cell and switches back to GSM mode.

SUMMARY

This disclosure is directed to a technique for efficient inter-RAT cell reselection in a wireless communication system. In general, following an unsuccessful cell reselection attempt, the technique involves upgrading one or more cell reselection criteria for the pertinent cell. By upgrading the cell reselection criteria, requirements for reselection of the cell in the future are made more stringent. The cell reselection technique may promote more efficient cell reselection performance, thereby reducing the frequency of repeated, unsuccessful reselection attempts for the same cell. In this manner, the cell reselection technique can be effective in reducing power consumption and computational overhead incurred by unsuccessful cell reselection attempts, thereby increasing standby time in a wireless communication device. The cell reselection technique may be implemented within a wireless communication device that supports two or more RAT types, such as WCDMA and GSM. Accordingly, in some embodiments, the cell reselection technique may be implemented within a GSM/WCDMA UE.

In one embodiment, the disclosure provides a method comprising comparing a first parameter associated with a wireless communication cell to a first criterion, and selecting the cell for wireless communication if the first parameter satisfies the first criterion. The method further comprises, upon selection of the cell, comparing a second parameter associated with the cell to a second criterion, and modifying the first criterion if the second parameter does not satisfy the second criterion. The disclosure also contemplates a wireless communication device configured to perform the method, and a computer-readable medium comprising instructions for performing the method.

As an example, the first parameter may be a measured signal value such as the CPICH Ec/No value for a UTRAN cell, as discussed in GSM Technical Specification 05.08. The CPICH Ec/No value generally refers to the received energy per chip divided by the power density in the band of the received common pilot channel (CPICH) signal for the cell. In this case, the first criterion may be a measured signal threshold, sometimes referred to as FDD_Qmin, that specifies a minimum acceptable CPICH Ec/No value. The FDD_Qmin value is described in GSM Technical Specification 05.08. The FDD_Qmin threshold may be specified by the GSM network. If the CPICH Ec/No value exceeds the FDD_Qmin threshold and the UTRAN cell has a stronger signal level than the serving and neighboring GSM cells, the wireless communication device selects the pertinent UTRAN cell.

The second parameter may be a measured signal value such as the CPICH RSCP value for a UTRAN cell, as discussed in Third Generation Partnership Project (3GPP) Technical Specification 25.304. The CPICH RSCP value represents the received signal code power, i.e., the received power on one of the CPICH codes, after despreading, measured on the pilot bits of the primary CPICH. In this case, the second criterion may be a threshold, sometimes referred to as Srxlevmin, that specifies a minimum acceptable CPICH RSCP value. The Srxlevmin threshold may be derived from parameters specified by the UTRAN network, such as the parameters sometimes referred to as Qrxlevmin and UE_TX_PWR_MAX_RACH. The UE_TX_PWR_MAX_RACH parameter generally refers to the maximum transmit power level that can be used by a UE when accessing the cell on a random access channel (RACH). If the CPICH RSCP value does not satisfy the Srxlevmin threshold, the method may involve increasing a first criterion such as the measured signal threshold, e.g., FDD_Qmin, to a level that ensures the measured CPICH RSCP will be sufficient to exceed the Srxlevmin threshold. In this manner, reselection of the same cell in the future will require a greater measured signal value, e.g., CPICH Ec/No, resulting in an increased likelihood that the subsequent reselection attempt will be successful.

In another embodiment, the disclosure provides a method comprising selecting a cell for wireless communication based on a first cell reselection criterion, deselecting the cell if the cell does not satisfy a second cell reselection criterion, and upgrading the first cell reselection criterion upon deselection of the cell. The disclosure also contemplates a wireless communication device configured to perform the method, and a computer-readable medium comprising instructions for performing the method.

The details of one or more embodiments are set forth in the accompanying drawings and the description below. Other features, objects, and advantages will be apparent from the description and drawings, and from the claims.

DETAILED DESCRIPTION

Figure 1:
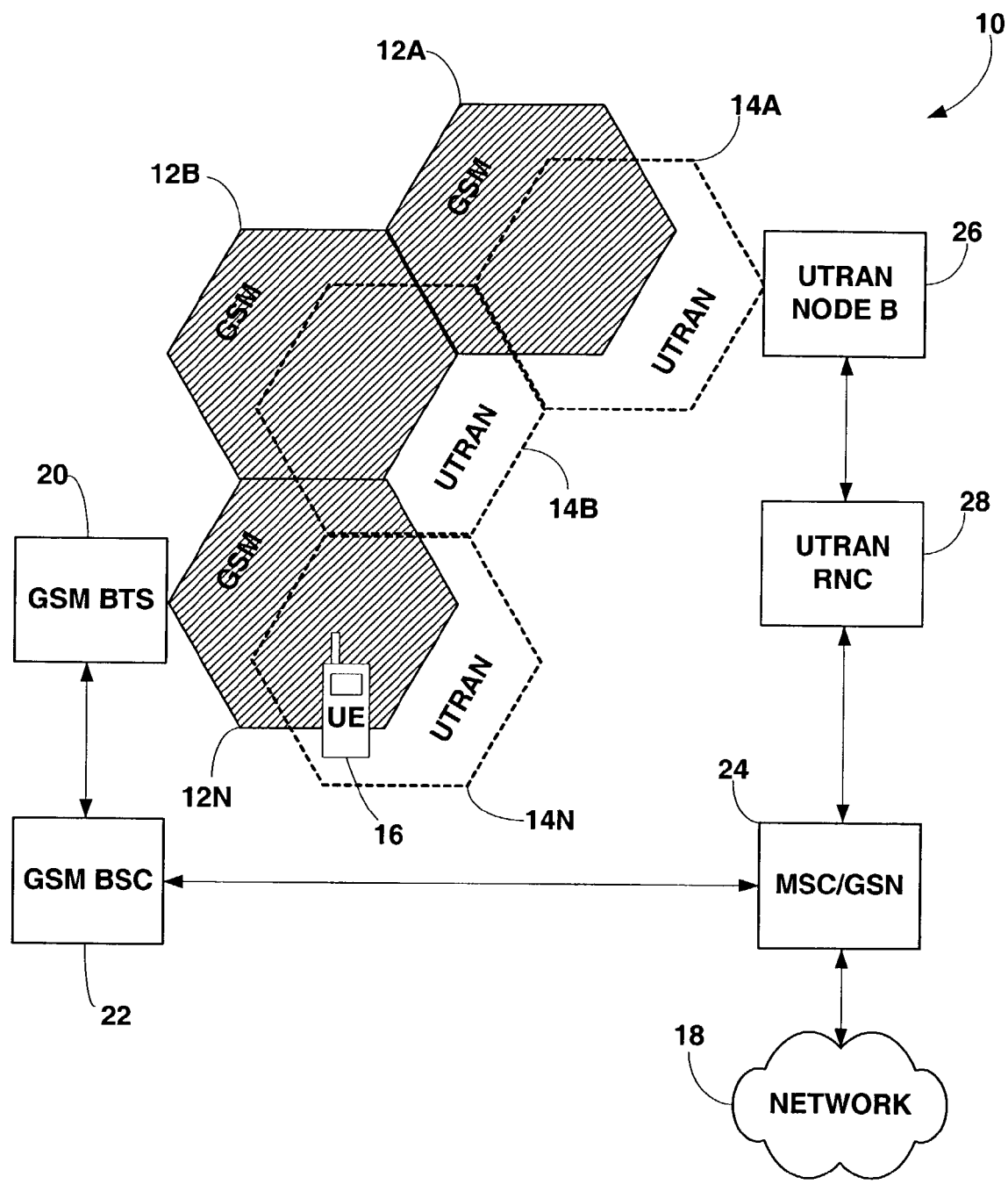
FIG. 1 is a block diagram illustrating a multi-RAT wireless communication system.

FIG. 1 is a block diagram illustrating a wireless communication system 10. Wireless communication system 10 may support multiple radio access technologies (RATs). As shown in FIG. 1, for example, wireless communication system 10 may include multiple GSM cells 12A–12N and multiple UTRAN cells 14A–14N distributed across a geographic area. A wireless communication device such as user equipment (UE) 16 provides access to network equipment associated with selected cells 12, 14 as the UE travels within the geographic area. UE 16 may take the form of a variety of different wireless communication devices, such as a mobile radiotelephone, satellite radiotelephone, wireless networking card, or the like. UE 16 offers support for two or more RATs, such as GSM and WCDMA in the example of FIG. 1.

GSM cells 12 are coupled to a network 18 via respective GSM base transceiver stations (BTS) 20, GSM base station controllers (BSC) 22 and a UMTS mobile switching center (MSC)/GPRS (General Packet Radio System) Support Node (GSN) 24. UTRAN cells 14 are coupled to network 18 via respective UTRAN node Bs 26, UTRAN radio network controllers (RNC) 28, and UMTS MSC/GSN 24. MSC/GSN 24 may provide a GGSN (Gateway GPRS Support Node) or an SGSN (Serving GPRS Support Node). Network 18 may provide interconnections to other networks, such as the public switched telephone network (PSTN) and the Internet. While operating within a geographic area, UE 16 applies a set of cell selection criteria to select particular cells 12, 14 for access to network 18.

In accordance with this disclosure, UE 16 is configured to promote more efficient cell reselection performance. Following an unsuccessful cell reselection attempt, UE 16 upgrades one or more criteria for reselection of the pertinent cell 14 in the future. The upgraded criteria can increase the likelihood that reselection of the pertinent cell 14 will be successful in the future. If a cell 14 satisfies the more stringent criteria for reselection, it is more likely that UE 16 will also be successful in camping on the cell. In particular, it is more likely that the pertinent cell 14 will also satisfy the additional cell selection criterion or criteria necessary to camp on the cell. In this manner, the cell reselection technique implemented by UE 16 can be effective in reducing the frequency of repeated, unsuccessful reselection attempts for the same cell 14. Consequently, UE 16 can reduce the excess power consumption and computing time that would otherwise be incurred due to unsuccessful cell reselection attempts, and thereby increase standby time. The operation of UE 16 will be described in greater detail below.

Figure 2:
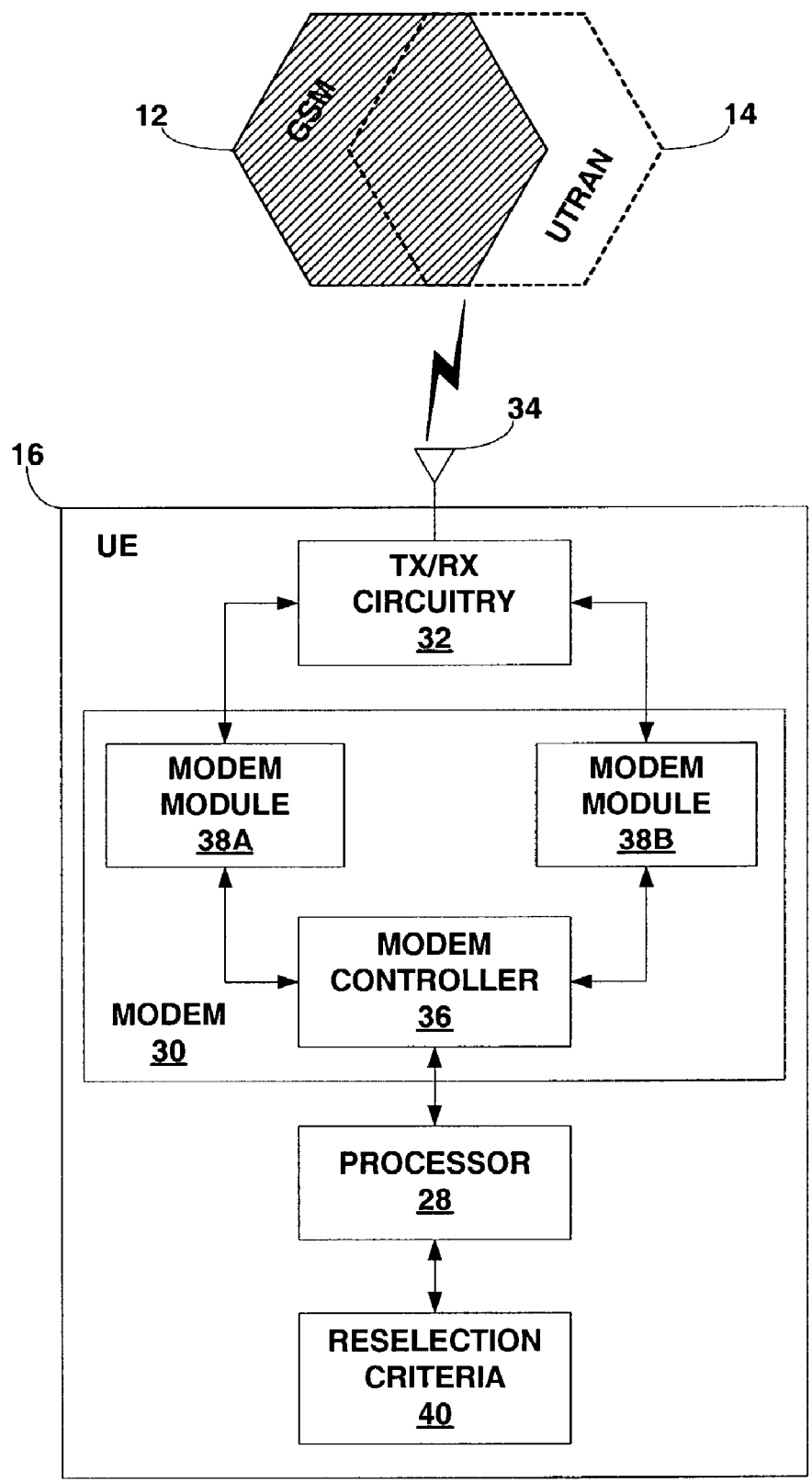
FIG. 2 is a block diagram illustrating a wireless communication device for use in the system of FIG. 1.

FIG. 2 is a block diagram illustrating an example wireless communication device in the form of UE 16 for use in system 10 of FIG. 1. As shown in FIG. 2, UE 16 may include a processor 28 that interacts with a modem 30 to control wireless communication via transmit/receive (TX/RX) circuitry 32 and radio frequency antenna 34. Modem 30 may include a modem controller 36 and modem modules 38A, 38B. Modem modules 38 permit communication according to different RAT types, such as GSM and WCDMA. In particular, modem controller 36 transitions between modem modules 38 depending on the type of RAT associated with a presently selected cell 12, 14. Processor 28, as well as modem 30, may take the form of a microprocessor, digital signal processor (DSP), ASIC, FPGA, or other logic circuitry programmed or otherwise configured to operate as described herein. Accordingly, modem modules 38 may take the form of programmable features executed by a common processor or discrete hardware units.

In operation, processor 28 accesses a set of cell reselection criteria 40 stored in memory carried by UE 16. Based on reselection criteria 40, processor 28 evaluates cells 12, 14 for reselection as UE 16 moves within a geographic area. In GSM idle mode, for example, UE 16 scans radio frequency channels in the GSM and UTRAN bands and performs signal strength measurements for neighboring GSM cells 12 and UTRAN cells 14. If UE 16 determines that one of the neighboring UTRAN cells 14 exhibits a signal strength that exceeds the signal strength of the serving and neighboring GSM cells, and the signal strength of the UTRAN cell satisfies a network-specified threshold, i.e., a first criterion, the UE selects the UTRAN cell for access to network 18. In this manner, UE 16 transitions wireless communication service from a first cell 12 operating according to a first radio access technology to a second cell 14 operating according to a second radio access technology. In the example of FIG. 1, the first and second RATs are GSM and WCDMA although other RATs are conceivable. In addition, similar techniques may be applied for transition from WCDMA to GSM.

The measured signal strength serves as a first parameter for selection of a UTRAN cell 14, and may be the CPICH Ec/No value discussed in Third Generation Partnership Project (3GPP) Technical Specification 25.304. The CPICH Ec/No value generally refers to the received energy per chip divided by the power density in the band of the received common pilot channel (CPICH) signal. The network-specified signal strength threshold may be the GSM-specified threshold sometimes referred to as FDD_QMIN. The FDD_QMIN value generally refers to a minimum threshold signal strength value for frequency division duplex mode communications, and serves as a first criterion for selection of a UTRAN cell 14. The FDD_QMIN provides a threshold CPICH Ec/No value for selection of a UTRAN cell 14. If the CPICH Ec/No value exceeds FDD_QMIN, and the UTRAN cells 14 exhibits a signal strength that exceeds the signal strength of the serving and neighboring GSM cells, UE 16 reselects the particular UTRAN cell 14 for communication services.

Upon reselection of a UTRAN cell 14, UE 16 switches to the WCDMA mode and attempts to "camp on" the UTRAN cell. To successfully camp on UTRAN cell 14, however, the cell also must satisfy one or more additional cell selection criteria, such as the criteria specified in Third Generation Partnership Project (3GPP) Technical Specification 25.304. If the UTRAN cell 14 does not satisfy the additional cell selection criteria, UE 16 deselects UTRAN cell 14 and switches back to GSM mode. Thus, the cell selection criteria analyzed by UE 16 may include a second parameter that is compared to a second criterion in order to permit the UE to camp on the pertinent UTRAN cell 14.

Analysis of the cell selection criteria may involve measurement of the CPICH Ec/No and CPICH RSCP value discussed in Third Generation Partnership Project (3GPP)

Technical Specification 25.304, and computation of Squal and Srxlev values based on the CPICH Ec/No and the CPICH RSCP values. The CPICH RSCP value represents the received signal code power, i.e., the received power on one of the CPICH codes, after despreading, measured on the pilot bits of the primary CPICH. More particularly, the cell selection criteria may specify that the Squal and Srxlev values must both be greater than zero in order to camp on the UTRAN cell, as discussed in Third Generation Partnership Project (3GPP) Technical Specification 25.304.

The Squal value is applicable for WCDMA cells and represents the cell selection quality value in dB. The Srxlev value represents the cell selection receive level value in dB. The Squal and Srxlev values may be determined as follows:

Squal=Qqualmeas−Qqualmin, and

Srxlev=Qrxlevmeas−Qrxlevmin−Pcompensation,

In the above expressions, Qqualmeas represents the measured cell quality value in terms of the quality of the received signal expressed by CPICH Ec/No in dB for WCDMA cells. Qrxlevmeas represents the measured received signal level value expressed by CPICH RSCP in dBm for WCDMA cells. Qqualmin represents the minimum acceptable measured cell quality value, and Qrxlevmin represents the minimum acceptable measured received signal level value. In other words, Qqualmin and Qrxlevmin represent the required levels of cell quality and received signal level within the selected cell. Pcompensation represents a compensation factor for the actual transmit power of UE 16 relative to a maximum transmit power in dBm.

UE 16 may be configured to adjust the cell reselection criteria for a particular cell 14 following an unsuccessful attempt to camp on the cell, e.g., to enhance cell reselection efficiency. For example, UE 16 may adjust a first criterion, such as the FDD_Qmin threshold, to increase the likelihood that the UE will be successful in camping on a selected cell 14. With an increased FDD_Qmin threshold, the CPICH Ec/No value must be larger for UE 16 to reselect the cell 14. With a larger CPICH Ec/No value, the CPICH RSCP value will also be larger. Accordingly, once UE 16 selects the cell 14 based on an increased CPICH Ec/No requirement, it is more likely that the CPICH RSCP will be sufficiently large so that the Srxlev value will satisfy the applicable requirements.

By increasing a first criterion for cell reselection, such as FDD_Qmin, IE 16 avoids repeatedly reselecting the same cell 14. Instead, UE 16 reselects the cell 14 only after the CPICH Ec/No satisfies the more stringent requirements posed by the increased FDD_Qmin. In other words, UE 16 avoids repeated reselection of cell 14 due to satisfaction of the FDD_Qmin threshold, followed by repeated failed attempts to camp on the pertinent cell due to failure to satisfy the Srxlev criterion. In this manner, UE 16 may avoid the excessive power consumption and computing overhead associated with transitions between GSM and WCDMA modes, which may require entire memory image swaps and reduce standby time for the UE. Rather, following an unsuccessful cell reselection attempt, UE 16 only switches to WCDMA mode when cell reselection is likely to be successful. Hence, UE 16 takes advantage of the relationship between the CPICH Ec/No value used for cell reselection and the CPICH RSCP value used in the calculation of the Srxlev value.

In some exemplary embodiments, UE 16 may increase the FDD_Qmin value by a predetermined amount following an unsuccessful cell selection attempt. The FDD_Qmin value, or some other similar threshold value, may be increased by a predetermined number of dBm or a percentage of dBm. The increased value may be stored as a first cell reselection criterion with reselection criteria 40 in a memory residing on UE 16. The criteria also may be stored remotely from UE 16 and retrieved when the UE undertakes a cell reselection process. In addition, a device remote from UE 16 may, in some embodiments, be responsible for increasing the first criterion. In each case, however, the result is application of a more stringent cell reselection criterion that may be effective in promoting cell reselection efficiency within system 10.

Figure 3:
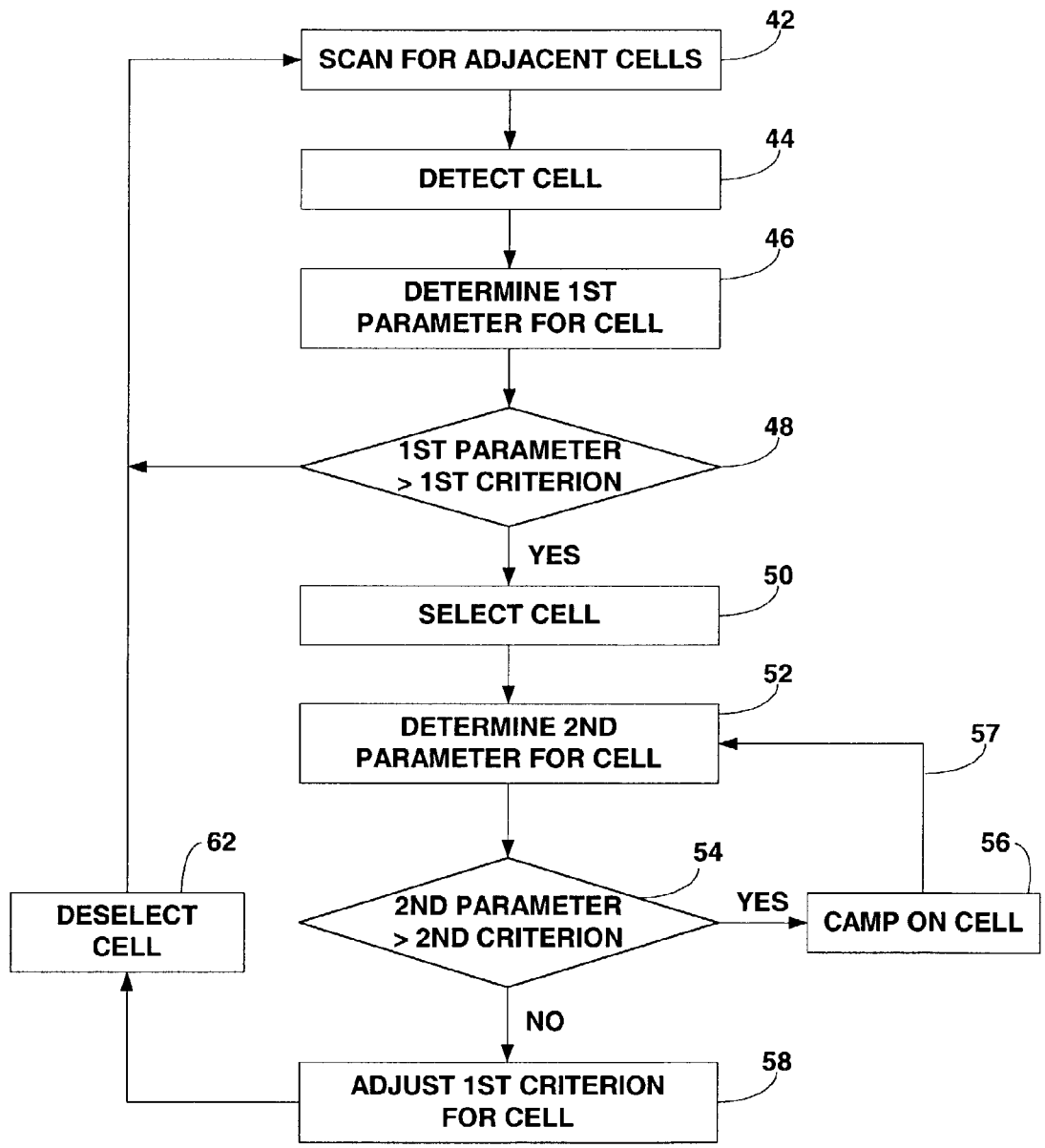
FIG. 3 is a flow diagram illustrating an exemplary cell reselection technique.

FIG. 3 is a flow diagram illustrating an exemplary cell reselection technique. The cell reselection technique may be performed within UE 16. As shown in FIG. 3, in GSM idle mode, UE 16 scans for adjacent cells 12, 14 (42). Upon detection of a cell (44), UE 16 measures a first parameter for the cell (46), such as the CPICH Ec/No value. UE 16 compares the first parameter to a first criterion (48), such as the FDD_Qmin value specified by system 10. If the first parameter satisfies the first criterion (48), e.g., exceeds a threshold value specified as the first criterion, and the cell exhibits a signal strength that exceeds the signal strength of the serving and other neighboring cells, UE 16 selects the pertinent cell (50).

Upon selection of the cell, UE 16 determines a second parameter (52) for the cell, such as the Srxlev value computed based on the measured CPICH RSCP value. If the second parameter satisfies a second criterion (54), e.g., exceeds a threshold value specified by the second criterion, UE 16 camps on the selected cell (56). For example, UE 16 may compute the Srxlev value from the measured CPICH RSCP value and then evaluate the Srxlev value to ensure that it is greater than zero. Upon camping on the cell, UE 16 may continue to monitor the first and second parameters (loop 57) to evaluate continuing link quality.

If the second parameter does not satisfy the second criterion, UE 16 may adjust the first criterion for the pertinent cell (58), and then proceed to drop, i.e., deselect, the cell (62). In the GSM-UTRAN example, UE 16 resumes GSM idle mode and continues to scan for adjacent cells. Notably, upon detection of the same cell in the future, i.e., detection of a cell for which reselection was unsuccessfully, UE 16 applies the adjusted first criterion (58) for comparison with the first criterion (48). In particular, UE 16 retrieves the adjusted criterion from memory, e.g., based on a unique identification associated with the detected cell. In this manner, UE 16 applies a more stringent first criterion as a prerequisite to reselection of the pertinent cell. As discussed above, this feature can promote cell reselection efficiency by reducing the frequency of unsuccessful cell reselection attempts.

Figure 4:
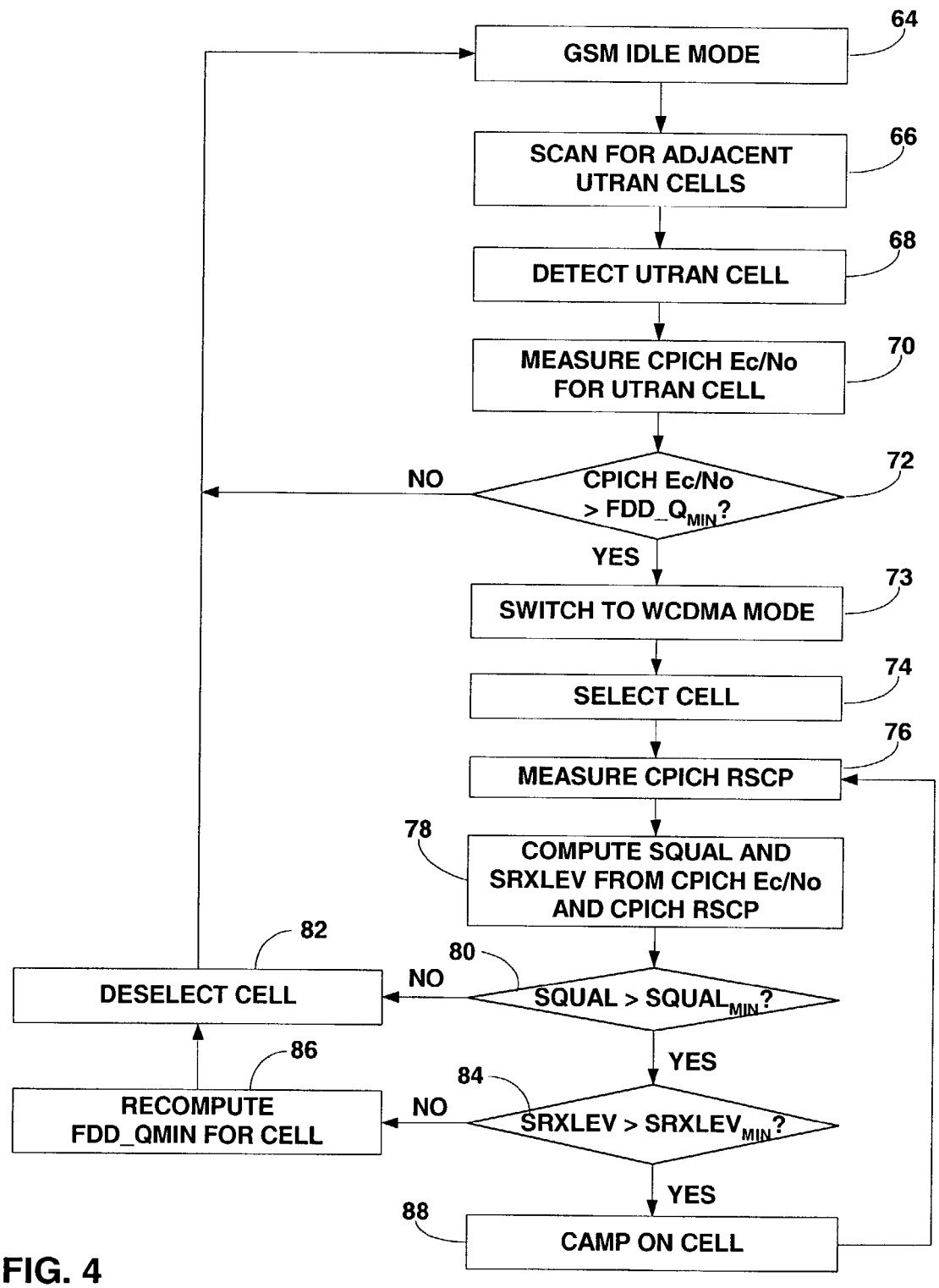
FIG. 4 is a flow diagram illustrating the cell reselection technique of FIG. 3 in greater detail for a GSM-WCDMA example.

FIG. 4 is a flow diagram illustrating the cell reselection technique of FIG. 3 in greater detail for a GSM-UTRAN example. As shown in FIG. 4, when UE 16 is in GSM idle mode (64), the UE scans for adjacent UTRAN cells (66). Upon detection of a UTRAN cell 14 (68), UE 16 measures the CPICH Ec/No value for the UTRAN cell (70). UE 16 compares the CPICH Ec/No to the FDD_Qmin threshold (72). If the CPICH Ec/No value does not exceed the FDD_Qmin threshold (72), UE 16 continues in GSM idle mode (64). If the CPICH Ec/No value exceeds the FDD_Qmin threshold (72), however, UE 16 switches to UTRAN mode (73), selects the pertinent cell (74) and attempts to camp on the cell.

Upon selection of the cell, UE 16 measures the CPICH Ec/No and CPICH RSCP values (76) and calculates the Squal and Srxlev values based on the CPICH Ec/No and CPICH RSCP values (78). The Squal and Srxlev values form part of the selection criteria for the cell, as specified in Third Generation Partnership Project (3GPP) Technical Specification 25.304. If the Squal value is not greater than a specified Squalmin value (80), UE 16 drops the selected cell (82) and returns to GSM idle mode (64). In some embodiments, the FDD_Qmin value may be adjusted based on a re-measurement of the CPICH Ec/No value upon reselection of the cell. The adjustment to the FDD Qmin may be desirable to avoid a situation in which the cell fails the Squal criterion due to differences between Squalmin and FDD_Qmin. If the Squal value exceeds the Squalmin value, UE 16 next determines whether the Srxlev value is greater than a specified Srxlevmin value (84). If not, UE 16 adjusts the first criterion for cell reselection by recomputing FDD_Qmin for the cell (86), and then drops the cell (82) and resumes GSM idle mode operation (64). In particular, UE 16 may increase the FDD_Qmin threshold to increase the likelihood that the cell, upon reselection, will support successful reselection in the future. If the Srxlev value exceeds the specified Srxlevmin value, however, UE 16 camps on the cell 14 (88), and continues to monitor the CPICH Ec/No and CPICH RSCP value (76) to evaluate the continued satisfaction of the selection criteria.

Following an unsuccessful reselection attempt for a particular cell 14, UE 16 thereafter refers to the increased FDD_Qmin threshold stored in memory for the cell for subsequent reselection attempts. As a result, UE 16 will not attempt to reselect the cell unless the CPICH Ec/No exceeds the increased FDD_Qmin threshold. Again, this technique can promote cell reselection efficiency and increase standby time in UE 16 by avoiding excessive power consumption cause by processing associated with repeated reselection attempts.

Various embodiments have been described. These and other embodiments are within the scope of the following claims.

What is claimed is:

1. A method comprising:
   at a mobile unit operating in a first wireless communication cell, measuring a first parameter associated with a second wireless communication cell;
   comparing the first parameter to a first criterion associated with the second cell;
   selecting the second cell for wireless communication if the first parameter satisfies the first criterion;
   upon selection of the second cell, computing a second parameter from the first parameter;
   comparing the second parameter to a second criterion associated with the second cell; and
   modifying the first criterion for the second cell if the second parameter does not satisfy the second criterion, said modifying increasing the likelihood that the second parameter, when computed from a subsequently measured first parameter, will satisfy the second criterion upon reselection of the second cell in response to the subsequently measured first parameter satisfying the modified first criterion.

2. The method of claim 1, wherein selecting the second cell includes transitioning wireless communication service from the first cell, said first cell operating according to a first radio access technology, to the second cell, said second cell operating according to a second radio access technology different from the first radio access technology.

3. The method of claim 2, wherein the first radio access technology is GSM and the second radio access technology is WCDMA.

4. The method of claim 3, further comprising selecting the second cell during GSM idle mode.

5. The method of claim 3, wherein the first parameter is a CPICH Ec/No value representing a received energy per chip divided by a power density in a band of a received common pilot channel (CPICH) signal for the second cell, and the first criterion is an FDD_Qmin threshold.

6. The method of claim 5, wherein the second parameter is a CPICH RSCP value for the second cell and the second criterion is an Srxlevmin threshold.

7. The method of claim 1, wherein the first criterion is a first threshold and the second criterion is a second threshold and wherein modifying the first criterion inch ides increasing the first threshold to a level that increases a likelihood that the second parameter will satisfy the second threshold.

8. The method of claim 1, further comprising:
   deselecting the second cell if the second parameter does not satisfy the second criterion; and
   comparing the first parameter to the modified fits criterion if the second cell is later considered for reselection.

9. A mobile wireless communication device comprising:
   means for a first parameter associated with a second wireless communication cell while operating in a first wireless communication cell;
   means for comparing the first parameter to a first criterion associated with the second cell;
   means for selecting the second cell for wireless communication if the first parameter satisfies the first criterion;
   means for computer a second parameter from the first parameter upon selection of the second cell,
   means for comparing the second parameter to a second criterion associated with the second cell; and
   means for modifying the first criterion for the second cell if the second parameter does not satisfy the second criterion, said modifying increasing the likelihood that the second parameter, when computer from a subsequently measured first parameter, will satisfy the second criterion upon reselection of the second cell in response to the subsequently measured first parameter satisfying the modified first criterion.

10. The device of claim 9, wherein the device, upon selection of the cell, transitions wireless communication service from the first cell, said first cell operating according to a first radio access technology, to the second cell, said second cell operating according to a second radio access technology different from the first radio access technology.

11. The device claim 10, wherein the first radio access technology is GSM and the second radio access technology is WCDMA.

12. The device of claim 11, wherein the device selects the second cell during GSM idle mode.

13. The device of claim 12, wherein the first parameter is a CPICH Ec/No level representing a received energy per chip divided by a power density in a hand of a received common channel (CPICH) signal for the second cell, and the first criterion is an FDD_Qmin threshold.

14. The device of claim 13, wherein the second parameter is a CPICH RSCP value for the second cell and the second criterion is an Srxlevmin threshold.

15. The device of claim 9, wherein the first criterion is a first threshold and the second criterion is a second threshold, and the device modifies the first criterion by increasing the first threshold to a level that increases a likelihood that the second parameter will satisfy the second threshold.

16. The device of claim 9, wherein the device deselects the second cell if the second parameter does not satisfy the second criterion, and compares the first parameter to the modified first criterion it the cell is later considered for reselection.

17. A computer-readable medium comprising instructions to cause a processor to:
   at a mobile unit operating in a first wireless communication cell, measure a first parameter associated with a second wireless communication cell;
   compare the first parameter to a first criterion associated with the second cell;
   select the second cell for wireless communication if the first parameter satisfies the first criterion;
   upon selection of the second cell, compute a second parameter from the first parameter;
   compare the second parameter to a second criterion associated with the second cell; and
   modify the first criterion for the second cell if the second parameter does not satisfy the second criterion, said modifying increasing the likelihood that the second parameter, when computer from a subsequently measured first parameter, will satisfy the second criterion upon reselection of the second cell in response to the subsequently measured first parameter satisfying the modified first criterion.

18. The computer-readable medium of claim 17, wherein the instructions cause the processor to, upon selection of the second cell, transition wireless communication service from the first cell, said first cell operating according to a first radio access technology, to the second cell, said second cell operating according to a second radio access technology different from the first radio access technology.

19. The computer-readable medium of claim 18, wherein the first radio access technology is GSM and the second radio access technology is WCDMA.

20. The computer-readable medium of claim 19, wherein the instructions cause the processor to select the second cell dining GSM idle mode.

21. The computer-readable medium of claim 19, wherein the first parameter is a CPICH Ec/No level representing a received energy per chip divided by a power density in a band of a received common pilot channel (CPICH) signal for the second cell, and the first criterion is an FDD_Qmin threshold.

22. The computer-readable medium of claim 21, wherein the second parameter is a CPICH RSCP value for the second cell and the second criterion is an Srxlevmin threshold.

23. The computer-readable medium of claim 17, wherein he first criterion is a first threshold and the second criterion is a second threshold, and the instructions cause the processor to modify the first criterion by increasing the first threshold to a level that increases a likelihood that the second parameter will satisfy the second threshold.

24. The computer-readable medium of claim 17, wherein the instructions cause the processor to deselect the second cell if the second parameter does not satisfy the second criterion, and compare the first parameter to the modified first criterion if the cell is later considered for reselection.

25. A wireless communication device comprising:
   means for comparing a first parameter associated with a second wireless communication cell to a first criterion while operating in first cell;
   means for reselecting the cell for wireless communication if the first parameter satisfies the first criterion;
   means for comparing, upon reselection of the cell, a second parameter associated with the second cell to a second criterion wherein the second parameter is computed from the first parameter; and
   means for modifying the first criterion if the second parameter does not satisfy the second criterion, said modifying increasing the likelihood that the second parameter, when computed from a subsequently measured first parameter, will satisfy the second criterion upon reselection of the second cell in response to the subsequently measured first parameter satisfying the modified first criterion.

26. The device of claim 25, wherein the reselecting means include means for transitioning wireless communication service from the first cell, said first cell operating according to a first radio access technology, to the second cell, said second cell operating according to a second radio access technology different from the first radio access technology.

27. The device of claim 26, wherein the first radio access technology is GSM and the second radio access technology is WCDMA.

28. The device of claim 27, further comprising the reselecting means reselects the second cell during GSM idle mode.

29. The device of claim 27, wherein the first parameter is a CPICH Ec/No value representing a received energy per chip divided by a power density in a band of a received common pilot channel (CPICH) signal for the second cell, and the first criterion is an FDD_Qmin threshold.

30. The device of claim 29, wherein the second parameter is a CPICH RSCP value for the second cell and the second criterion is an Srxlevmin threshold.

31. The device of claim 25, wherein the first criterion is a first threshold and the second criterion is a second threshold, and the modifying means increases the first threshold to a level that increases a likelihood that the second parameter will satisfy the second threshold.

32. The device of claim 25, further comprising:
   means for deselecting the second cell if the second parameter does not satisfy the second criterion; and
   means for comparing the first parameter to the modified first criterion if the cell is later considered for reselection.

* * * * *

UNITED STATES PATENT AND TRADEMARK OFFICE
CERTIFICATE OF CORRECTION

PATENT NO. : 6,978,138 B2  
DATED : December 20, 2005  
INVENTOR(S) : Patricia A. Japenga and Michael Kevin Spartz Page 1 of 1

It is certified that error appears in the above-identified patent and that said Letters Patent is hereby corrected as shown below:

<u>Title page,</u>  
Item [74], *Attorney, Agent, or Firm*, "Kanyon Jenckes" should read  
-- Kenyon Jenckes --.

Signed and Sealed this

Twenty-third Day of May, 2006

JON W. DUDAS  
*Director of the United States Patent and Trademark Office*